United States Patent
Akamine et al.

(10) Patent No.: US 9,815,741 B2
(45) Date of Patent: Nov. 14, 2017

(54) REFRACTORY FOR CASTING, NOZZLE FOR CASTING AND SLIDING NOZZLE PLATE USING SAME

(71) Applicant: Krosakiharima Corporation, Fukuoka (JP)

(72) Inventors: Keiichiro Akamine, Fukuoka (JP); Kazuo Ito, Fukuoka (JP); Taro Makino, Fukuoka (JP)

(73) Assignee: KROSAKIHARIMA CORPORATION, Fukuoka (JP)

( * ) Notice: Subject to any disclaimer, the term of this patent is extended or adjusted under 35 U.S.C. 154(b) by 0 days.

(21) Appl. No.: 15/128,265

(22) PCT Filed: Feb. 12, 2015

(86) PCT No.: PCT/JP2015/053817
§ 371 (c)(1),
(2) Date: Sep. 22, 2016

(87) PCT Pub. No.: WO2015/151599
PCT Pub. Date: Oct. 8, 2015

(65) Prior Publication Data
US 2017/0088469 A1   Mar. 30, 2017

(30) Foreign Application Priority Data
Mar. 31, 2014   (JP) .................................. 2014-73350

(51) Int. Cl.
*C04B 35/103*   (2006.01)
*C04B 35/56*   (2006.01)
(Continued)

(52) U.S. Cl.
CPC ............ *C04B 35/103* (2013.01); *B22D 41/32* (2013.01); *B22D 41/54* (2013.01);
(Continued)

(58) Field of Classification Search
CPC .................. C04B 35/1015; C04B 35/103; C04B 35/106; C04B 35/5603
See application file for complete search history.

(56) References Cited

U.S. PATENT DOCUMENTS

| 8,465,720 B2 * | 6/2013 | Akamine | C01B 31/301 |
| | | | 423/415.1 |
| 8,728,966 B2 | 5/2014 | Akaine et al. | |

(Continued)

FOREIGN PATENT DOCUMENTS

| CN | 102898157 | 1/2013 |
| JP | H01313358 | 12/1989 |

(Continued)

OTHER PUBLICATIONS

International Search Report dated May 7, 2015 for PCT/JP2015/053817 filed Feb. 12, 2015.

(Continued)

*Primary Examiner* — Karl Group
(74) *Attorney, Agent, or Firm* — Paul D. Bianco; Gary S. Winer; Fleit Gibbons Gutman Bongini & Bianco PL

(57) ABSTRACT

A refractory to be used repeatedly or for a long period of time, such as a refractory for casting, especially a nozzle for casting and an SN plate, has improved tolerance. The refractory for casting contains $Al_4O_4C$ in the range of 15 to 60% by mass, both inclusive, an Al component as a metal in the range of 1.2 to 10.0% by mass, both inclusive, and a balance including $Al_2O_3$, a free C, and other refractory component; a sum of $Al_4O_4C$, $Al_2O_3$, and the Al component as a metal is 85% or more by mass; and a content of $Al_4O_4C$ ($Al_4O_4C$), a content of the Al component as a metal (Al), and a content of the free carbon (C). The contact of the free carbon satisfies the following Equation 1 and Equation 2:

$$1.0 \leq C/(Al_4O_4C \times 0.038 + Al \times 0.33) \text{ (Equation 1)}$$

and $$1.0 \geq C/(Al_4O_4C \times 0.13 + Al \times 0.67) \text{ (Equation 2)}.$$

17 Claims, 2 Drawing Sheets

(51) Int. Cl.
*B22D 41/54* (2006.01)
*B22D 41/32* (2006.01)
*F27D 3/14* (2006.01)
*C04B 35/632* (2006.01)
*C04B 35/645* (2006.01)

(52) U.S. Cl.
CPC ........ *C04B 35/5603* (2013.01); *C04B 35/632* (2013.01); *C04B 35/645* (2013.01); *F27D 3/14* (2013.01); *C04B 2235/3217* (2013.01); *C04B 2235/3895* (2013.01); *C04B 2235/402* (2013.01); *C04B 2235/422* (2013.01); *C04B 2235/602* (2013.01)

(56) References Cited

U.S. PATENT DOCUMENTS

| | | | |
|---|---|---|---|
| 2012/0035384 A1* | 2/2012 | Akamine | C01B 31/301 556/179 |
| 2013/0059719 A1 | 3/2013 | Akamine | |

FOREIGN PATENT DOCUMENTS

| | | |
|---|---|---|
| JP | H11199328 | 7/1999 |
| JP | 2000094121 | 4/2000 |
| JP | 2001285289 | 10/2001 |
| JP | 2009119683 | 6/2009 |
| JP | 2011104596 | 6/2011 |
| JP | 2012072006 | 4/2012 |
| JP | 2013053034 | 3/2013 |
| WO | 2009/119683 | 10/2009 |
| WO | 2011058811 | * 5/2011 |

OTHER PUBLICATIONS

Written Opinion dated Oct. 8, 2015 for PCT/JP2015/053817 filed Feb. 12, 2015.

English translation of the International Preliminary Report on Patentability with the Written Opinion dated Oct. 4, 2016 for PCT/JP2015/053817 filed Feb. 12, 2015.

* cited by examiner

[Fig.1]
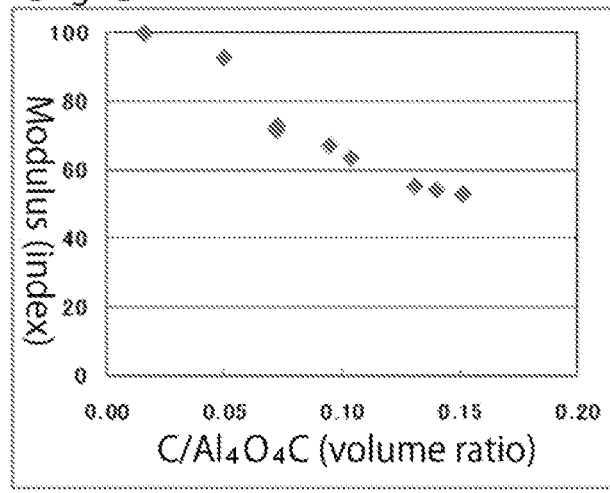
[Fig.2]
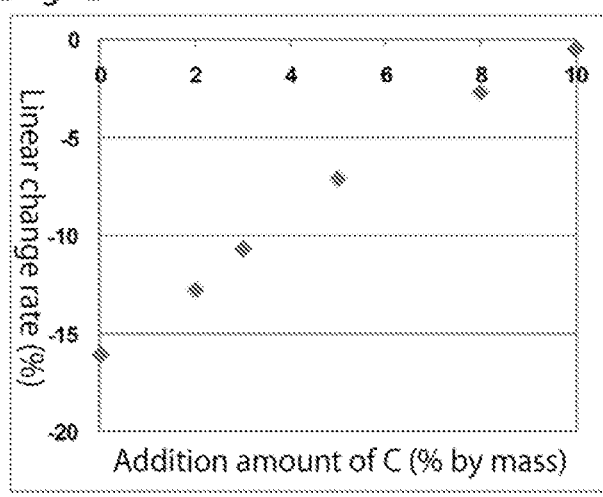
[Fig.3]
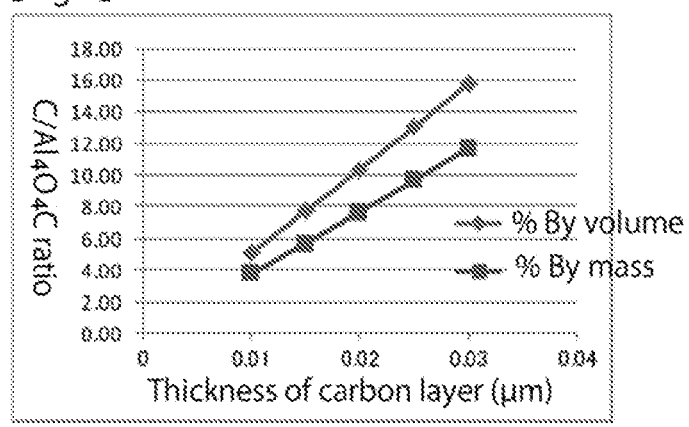

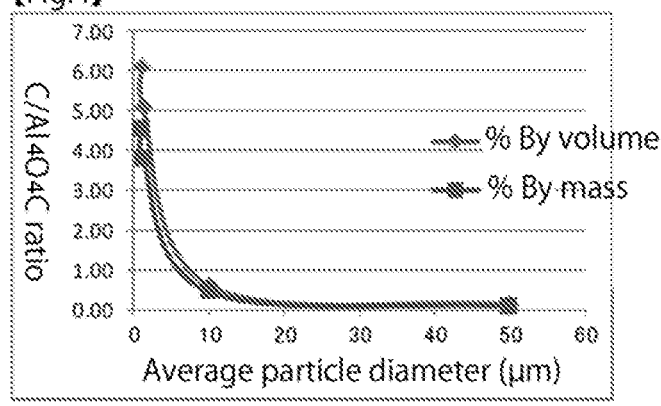
[Fig.4]
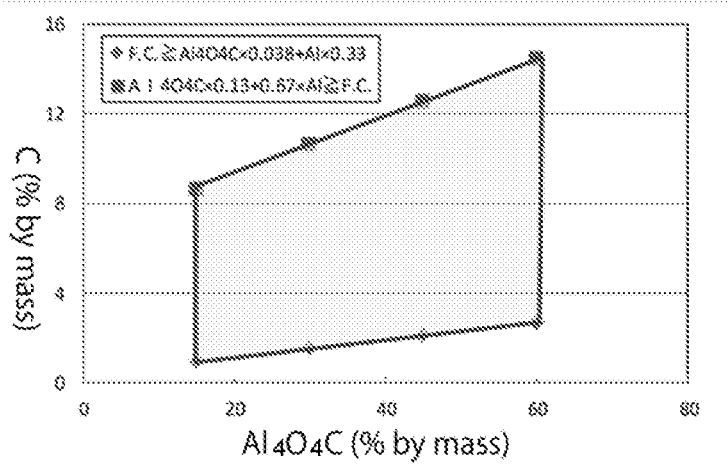
[Fig.5]

REFRACTORY FOR CASTING, NOZZLE FOR CASTING AND SLIDING NOZZLE PLATE USING SAME

TECHNICAL FIELD

The present invention relates to a refractory for casting which is used for steel casting, a nozzle for casting which uses the refractory, and a plate for a sliding nozzle (hereinafter, this is referred to as "SN plate") which is used for a sliding nozzle device to control a flow rate of a melted steel (hereinafter, this device is referred to as "SN device").

BACKGROUND ART

In casting of a steel, a nozzle for casting which is a flow path of a melted steel discharged from a smelting vessel including a ladle and a tundish, and an SN device which controls a flow rate of a melted steel are used. In this SN device, two or three SN plates having nozzle holes which are made of a refractory are used. These SN plates are piled up under a restricted condition and moved under a state applied with a surface pressure, wherein the flow rate of the melted steel is controlled by adjusting an opening degree of the nozzle hole.

Because of this, the SN plate is required to have characteristics including the mechanical strength endurable to a use under the restricted condition, the thermal shock resistance to a thermal stress during the time of casting, the corrosion resistance and the oxidation resistance to the components present in a melted steel, a slag, and the like, and "the surface-roughing resistance", a resistance to "the surface roughness", i.e., an attrition received in a moving surface which is an operation surface.

In the SN plate, an alumina carbonaceous refractory is generally used; and the refractory is roughly classified, depending on the production method thereof, into a high-temperature baked product which is baked at a high temperature of about 1000° C. or higher and a low-temperature baked product which is baked at a temperature of lower than about 1000° C. Generally, the high-temperature baked product has a higher porosity than the low-temperature baked product due to a change in the organization thereof during baking; and thus, the former is produced by further impregnation with a tar, a pitch, or the like. Therefore, the high-temperature baked product has the organization having high density and strength because of the baking at a high temperature as well as the impregnation; and in addition, because this product is baked at a high temperature, not only it is thermally stable to a high temperature region but also it has an excellent characteristic in the thermal shock resistance. However, this product undergoes the processes including baking at a high temperature, impregnation with a tar or a pitch, and coking after the impregnation so as to previously remove a harmful substance and a substance which generates a smoke during the use thereof, so that a cost of production of the SN plate becomes very high in terms of an energy and a process; and in addition, an environmental care becomes necessary because this method uses a tar, a pitch, or the like.

On the contrary, the low-temperature baked product has merits that the energy cost can be made lower and the process is environmentally more friendly as compared with the high-temperature baked product. In order to furnish this low-temperature baked product with the strength and the oxidation resistance, a metal aluminum or a metal aluminum-containing alloy, each having a low melting point, is added thereto; and many products, so-called light baked products or so-called non-baked products, which are baked in various temperature regions below about 1000° C., have been disclosed.

For example, Patent Document 1 discloses the production method in which after a blend of a refractory raw material, a phenol resin, and a metal aluminum powder including an atomized powder in the ball-like form is kneaded and molded, this blend is subjected to a heat treatment in the temperature range of 550 to 650° C. It is reported that when the temperature of the heat treatment is below 550° C., not only the oxidation resistance of the phenol resin decreases but also a decomposition gas is generated thereby generating an odor during the use thereof, while when the temperature is above 650° C., an aluminum carbide is formed. It is reported that when the aluminum carbide is formed, this reacts readily with water at a normal temperature and a normal pressure to form a metal aluminum hydroxide with accompanying a volume expansion and a weight increase, thereby often causing collapse of the plate during the storage thereof.

Patent Document 2 discloses the method in which a phenol resin is added to a blend containing 90 to 99.5% by mass of an aggregate of a fire resistant inorganic material and 0.5 to 10% by mass of a metal aluminum fiber or a metal aluminum alloy fiber, and then, the resulting mixture is subjected to a heat treatment at 700° C., 850° C., or 1000° C. It is reported that by carrying out the heat treatment at a temperature higher than a melting point of the metal aluminum or of the metal aluminum alloy (melting point of the metal aluminum is 660° C.), the metal aluminum penetrates into among the particles in the neighborhood organization thereof, thereby not only the strength of the refractory can be dramatically improved but also the thermal shock resistance can be significantly enhanced. It is also reported that when the temperature of the heat treatment is higher than 1000° C., excellent characteristics of the metal aluminum or of the metal aluminum alloy as the fiber cannot persist, thereby not only leading to an indifference in the characteristics between the fiber and the powder but also forming, as penetration of the metal aluminum progresses, a void in the place where the fiber was present, which can rather deteriorate the corrosion resistance.

Patent Document 3 discloses the production method in which a phenol resin is added to a raw material including a fire resistant inorganic raw material, a carbonaceous raw material, and a metallic raw material, these raw materials constituting a continuous particle size distribution system with the particle diameter thereof being in the range of 0.1 to 4000 μm, both inclusive, and then, the resulting mixture is baked in a non-oxidative atmosphere in the temperature range of 800 to 1500° C. without carrying out the impregnation treatment. In Example therein, the refractory which is baked at 850° C. and whose apparent porosity is 5.0% is disclosed.

Patent Document 4 discloses the refractory which is produced by adding an organic binder to a refractory raw material blend including 0.5 to 20% by mass of a metal aluminum and/or a metal aluminum alloy followed by subjecting the resulting mixture to kneading, molding, and a heat treatment in the temperature range of 400 to 1000° C., both inclusive, but not followed thereafter by impregnation with a carbonaceous liquid substance including a tar and a pitch, thereby affording the refractory with the compressive strength of not less than 180 MPa and the weight increase rate of not more than 1% by a slaking test with an autoclave.

As disclosed in Patent Documents 1 to 4, in general, conventional refractories for casting, especially a refractory for an SN plate (hereinafter, referred to as "plate refractory), which is required to have excellent properties including the corrosion resistance and the abrasion resistance, is composed of mainly oxide materials including an alumina-based oxide, a magnesia-based oxide, a spinel-based oxide, and a zirconia-based oxide. However, these oxides have a problem of an insufficient thermal shock resistance because of a large thermal expansion rate.

In the refractory for casting, especially in the plate refractory, with regard to the method for enhancing the thermal shock resistance thereof, a method using a raw material containing a silica including a mullite, or a method concurrently using with it a raw material containing a zirconia including a zirconia mullite and an alumina zirconia is often employed.

A raw material containing a silica (silica-containing raw material), for example, a mullite, has a lower thermal expansion rate in the mineral itself than a mineral constituting an alumina-based oxide, a magnesia-based oxide, a spinel-based oxide, and a zirconia-based oxide, or the like; and therefore, by decreasing the thermal expansion rate as a refractory by adjusting the contents thereof, the thermal shock resistance of the refractory can be improved.

A raw material containing a zirconia (zirconia-containing raw material) has a lower thermal expansion rate as compared with an alumina raw material; and in addition, because of a specific expansion behavior accompanied with a zirconia-specific phase transition, a microcrack or a microspace is formed in the organization thereby generating an effect to decrease in the modulus of the refractory; and therefore, it is presumed that the thermal shock resistance is afforded by the effects of the decreases in the thermal expansion rate and in the modulus.

In order to improve the thermal shock resistance by concurrently using these raw materials containing a silica or a zirconia, it is necessary to have a comparatively large amount of them contained therein, for example, in the range of about 5.0 to 15.0% by mass. However, use of such a large amount of these raw materials can rather cause a decrease in the tolerance thereof.

Namely, the silica component is readily reduced in an atmosphere co-existing with a carbon to become an SiO gas which can easily disappear to make the refractory organization less dense, so that an iron-based oxide or a slag component can readily infiltrate deep into the organization; and in addition, the oxidation resistance is prone to be decreased. Further, the silica component reacts with an iron-based oxide derived from a melted steel, a steel inclusion, and a slag component to form low-melting point substances thereby leading to a dissolution loss. Accordingly, when a large amount of the silica component including a mullite and a zirconia mullite is contained therein, the tolerance thereof decreases due to the decreases in the corrosion resistance, the oxidation resistance, and the like.

In the case of the zirconia component, because an effect including an effect of a stress relaxation due to the microcrack, the microspace, or the like is utilized; this is effective in the case that the refractory is used less repeatedly, or in a comparatively mild use condition including a comparatively short period of a casting time, or the like. However, in the refractory concurrently using the zirconia-containing raw material, under the condition of the use for a long period of time or of the repeat use for many times, a damage or the like due to an edge defect, which is caused by expansion of the crack or deterioration of the organization, an abrasion of the moving surface, or the like, increases, thereby rather causing a decrease in the tolerance thereof.

Meanwhile, the repeat use herein means as follows. That is, in the case of using thereof as the SN plate for a ladle, or even as the tundish used under the condition of a hot rotation or the like, after casting under the high temperature condition in which the temperature around a nozzle hole is not lower than 1000° C., the plate itself is cooled to a temperature condition of not higher than about 500° C. until next casting, namely, meaning the repeat use condition between heating at a high temperature and cooling. The multiple repeat use means the use condition of plural ch (for example 8 ch or more) in the case of the ladle, and the use condition of 2 or more castings in the case of the hot rotation tundish.

Also, the use for a long period of time means the long time condition during receiving of a steel with a total time of casting not less than about 500 minutes in the use as the ladle, and the condition of not less than 800 minutes in the use as the hot rotation tundish.

These use conditions cause a change in the organization of the plate refractory because of the repeated heating and cooling as well as the exposure to the high temperature conditions for a long period of time. Therefore, these are severe use conditions to cause an increase in an attrition of the plate refractory.

Many of the refractory for casting employ a carbon bond in the bonding organization thereof. Therefore, in order to protect this carbon from being lost by oxidation, a metal represented by a metal aluminum which has a high oxygen affinity is often used concurrently. The metal aluminum is also applied to the refractories baked at a low temperature or at a high temperature as disclosed in Patent Documents 1 to 4.

On the other hand, when a zirconia-containing raw material is concurrently used with a refractory which is applied with and contains a low-melting point metal including the metal aluminum which has a high oxygen affinity as mentioned above, this becomes one cause to decrease the tolerance of the refractory.

The cause and mechanism thereof may be presumed as follows.

Under the condition in which an area around the nozzle hole of the nozzle for casting, a moving surface of the SN plate, and the like are exposed to a high temperature, the atmosphere inside the pore of the refractory becomes a reductive atmosphere because a carbon is present therein, too. In addition, when the metal aluminum is present in the organization, an oxygen concentration therein further decreases, resulting in a highly reductive atmosphere. In this highly reductive atmosphere, not only a silica but also a zirconia is readily reduced, thereby reacting thereafter with the carbon to form zirconium carbide, zirconium carbon monoxide, and zirconium. The zirconium carbide, zirconium carbon monoxide, and zirconium thus formed have a high oxygen affinity, so that they are readily oxidized under an oxidative atmosphere to form a zirconia. Upon this, the volume expansion takes place to generate a defect in the organization. As a consequence, during the time of casting for a long period of time or during the repeat use, the refractory organization is deteriorated to cause various damages as described before.

The substance like the metal aluminum, which has a high oxygen affinity as mentioned before, is highly effective as an antioxidant; but when the substance is exposed to the high temperature condition for a long period of time in the refractory organization, the oxide raw material in the refractory is reduced to cause a change in the properties thereof, thereby also causing an adverse effect such as deterioration of the organization as the refractory or a decrease in the tolerance thereof.

Meanwhile, other metals including magnesium generate the reactions similar to that of the metal aluminum because of the oxygen affinity thereof, though the temperature range of the reactivity and the like are different depending on the metals. Accordingly, an addition of a raw material containing a silica or a zirconia including an alumina zirconia and a zirconia mullite, all of which have been used in conventional technologies and the amount of which is large but about just enough to improve the thermal shock resistance thereof, to a refractory containing the metal aluminum, magnesium, and an alloy containing them, has a limit in improvement of the tolerance in thermally severe conditions including the casting for a long period of time and the multiple repeat use.

The reaction of the metal aluminum with the raw material containing a zirconia or a silica as described above or the degree of the damage in the refractory is different depending on the relative contents of these substances and the forms in their presence. Also, if a large amount of the metal aluminum is used in the refractory composition like this, the refractory is densified with an increase in the modulus by the reaction of the metal aluminum, thereby leading to a decrease in the thermal shock resistance; and thus, the repeat use thereof, especially in the SN plate of a large size, becomes difficult.

On the other hand, Patent Document 5 discloses the SN plate wherein a content of $Al_4O_4C$ as a mineral phase is in the range of 5 to 95% by mass, the thermal expansion rate thereof is $8\times10^{-6}$/K or less, and the flexural modulus thereof at a normal temperature is in the range of 10 to 60 MPa, both inclusive.

Because $Al_4O_4C$ is low in the thermal expansion, it is expected that this may contribute to improvement in the thermal shock resistance. However, when $Al_4O_4C$ is exposed to the oxidative condition for a long period of time, or subjected to the multiple repeat use, or the like, the oxidation thereof to $Al_2O_3$ advances; and therefore, the effect thereof as the low expanding base material decreases. Accordingly, only by including $Al_4O_4C$ therein, an improving effect in the thermal shock resistance or in the tolerance cannot be obtained sufficiently.

CITATION LIST

Patent Documents

Patent Document 1: Japanese Patent Laid-Open Publication No. 2000-94121
Patent Document 2: Japanese Patent Laid-Open Publication No. H01-313358
Patent Document 3: Japanese Patent Laid-Open Publication No. H11-199328
Patent Document 4: International Patent Laid-Open Publication No. 2009/119683
Patent Document 5: Japanese Patent Laid-Open Publication No. 2011-104596

SUMMARY OF THE INVENTION

Problem to be Solved by the Invention

The problem to be solved by the present invention is to improve a tolerance of a refractory to be used repeatedly or for a long period of time, such as a refractory for casting, especially a nozzle for casting and an SN plate.

Means for Solving the Problem

The present invention relates to a refractory for casting, a nozzle for casting, and an SN plate, as shown in the following 1 to 6.

1. A refractory for casting, wherein the refractory for casting contains $Al_4O_4C$ in the range of 15 to 60% by mass, both inclusive, an Al component as a metal in the range of 1.2 to 10.0% by mass, both inclusive, and a balance including $Al_2O_3$, a free C, and other refractory component; a sum of $Al_4O_4C$, $Al_2O_3$, and the Al component as a metal is 85% or more by mass; and a content of $Al_4O_4C$ ($Al_4O_4C$), a content of the Al component as a metal (Al), and a content of the free carbon (C) satisfy following Equation 1 and Equation 2.

$$1.0 \leq C/(Al_4O_4C \times 0.038 + Al \times 0.33) \quad \text{Equation 1}$$

$$1.0 \geq C/(Al_4O_4C \times 0.13 + Al \times 0.67) \quad \text{Equation 2}$$

2. The refractory for casting according to 1, wherein the $Al_4O_4C$ is derived from an $Al_4O_4C$-containing raw material particle produced by an electromelting method.
3. The refractory for casting according to 2, wherein a size of an $Al_4O_4C$ crystal in the $Al_4O_4C$-containing raw material particle is 20 μm or more as an average diameter when a cross section of the $Al_4O_4C$ crystal is converted to a circle.
4. The refractory for casting according to any one of 1 to 3, wherein the other refractory component in the balance is one or plural materials selected from the group consisting of MgO, $SiO_2$, a tetragonal or a monoclinic $ZrO_2$, SiC, $B_4C$, BN, $Si_3N_4$, and a metal Si.
5. The refractory for casting according to any one of 1 to 4, wherein the metal Si is contained therein with a weight ratio of metal Si to Al component as a metal in the range of 0.1 to 2, both inclusive.
6. A nozzle for casting or an SN plate, wherein the refractory for casting according to any one of 1 to 5 is arranged in part or all of the nozzle for casting or of the SN plate.

Hereunder, the present invention will be explained in detail.

In order to resolve the problem present in the raw material containing a zirconia or a silica as described above, the present invention regards $Al_4O_4C$ as a main composition material of the refractory. The thermal expansion rate of $Al_4O_4C$ is $4\times10^{-6}$/K or less, an about half of that of an alumina; and thus, $Al_4O_4C$ is of a low thermal expansion. Because of this low thermal expansion, $Al_4O_4C$ can furnish the refractory with a high thermal shock resistance. Moreover, the effect to lower the thermal expansion rate is higher than that of a conventional technology which uses a raw material containing a zirconia including an alumina zirconia. In addition, $Al_4O_4C$ neither undergoes the phase transfer as the zirconia does even in a high temperature region nor shows the specific expansion behavior, so that $Al_4O_4C$ does not have an effect to decrease the modulus, while it has an advantage that deterioration of the organization does not readily take place even by the repeat use.

$Al_4O_4C$ separates $Al_2O_3$ by the reaction expressed by the Equation 3 in a carbon monoxide atmosphere at a temperature of 850° C. or higher. With this, at first a dense alumina layer is formed on an operation surface; and this alumina layer protects $Al_4O_4C$ thereby suppressing the change of $Al_4O_4C$ due to further oxidation and so forth. $Al_4O_4C$ shows excellent properties including the corrosion resistance and the abrasion resistance because it does not contain a large amount of the silica component—this is low in the corrosion resistance—in the refractory including the alumina-protection layer on the surface thereof.

$$Al_4O_4C+2CO=2Al_2O_3+3C \quad \text{Equation 3}$$

Meanwhile, $Al_4O_4C$ also forms an alteration layer which includes a nitride or a carbide depending on the atmosphere.

Because $Al_4O_4C$ is separated as $Al_2O_3$ as mentioned above, this is better in the corrosion resistance as compared with the zirconia-containing raw material including an alumina-zirconia raw material and a zirconia mullite raw material; and therefore, an improvement can be expected with regard to an attrition of the moving surface.

When the content of $Al_4O_4C$ as the mineral phase is less than 15% by mass, the decreasing effect to the thermal expansion rate is so small that the thermal shock resistance is insufficient. On the other hand, when the content of $Al_4O_4C$ is more than 60% by mass, the content of $Al_4O_4C$ is relatively too much, so that it becomes difficult to suppress the sintering, which occurs along with formation of $Al_2O_3$ from $Al_4O_4C$, only by adjustment of the contents of the free C and the Al component as a metal.

Meanwhile, in general, the plate refractory is often used in the state in which the periphery thereof is bound by a band made of a shrunk iron or in the state in which the plate refractory is arranged in a vessel made of an iron. Because the thermal expansion rate of the refractory decreases with an increase of the $Al_4O_4C$ content in the refractory, the expansion volume of the iron-made band or of the iron-made vessel becomes larger than the expansion volume of the refractory during casting; therefore, occasionally, the iron-made band can leave from the refractory or a space can be formed between the refractory and the iron-made vessel. These phenomena can become not only the cause for extension of the crack of the refractory itself especially when it is used for a long period of time but also the cause for dropping-off of the refractory (in the plate-like form) when it is repeatedly used. Because of these reasons, the $Al_4O_4C$ content as a mineral phase needs to be in the range of 15 to 60% by mass, both inclusive.

When exposed to an oxidative condition due to the condition including the use for a long period of time or the multiple repeat use, $Al_4O_4C$ is changed to $Al_2O_3$ progressively, so that the effect as the low thermal expansion base material decreases. In addition, given that the density of $Al_2O_3$ is 3.9, the density of C is 2.0, and the density of $Al_4O_4C$ is 2.7, about 3.1% of volume expansion takes place along with the reaction of the Equation 3. Upon the change of $Al_4O_4C$ to $Al_2O_3$ as well as along with the progress of this change, densification of the refractory advances, and further, because of progress of the sintering and so forth, the tendency of decrease in the thermal shock resistance also appears.

Accordingly, preferably $Al_4O_4C$, which is a main fire resistant aggregate added so as to retain the thermal shock resistance, persists as $Al_4O_4C$ by suppressing the change thereof to $Al_2O_3$.

Therefore, in the present invention, a metal aluminum is made concurrently exist as the aggregate in the $Al_4O_4C$-containing refractory thereby making the metal aluminum preferentially catch an oxygen before $Al_4O_4C$ does; in this way, $Al_4O_4C$ is protected thereby increasing the residual amount thereof.

Because the melting point of the metal aluminum or of the metal aluminum alloy is not higher than 660° C., the oxidation resistance effect can be expressed in a wide temperature range from a neighborhood of about 660° C. to the temperature of casting. Accordingly, in the case including the case that, for example, in the repeat use or the like of the SN plate, a low temperature portion is present in the temperature distribution in the plate refractory, this can contribute to an increase in the oxidation resistance. Namely, not only oxidation of the refractory (carbon component) can be suppressed or prevented in the temperature range not higher than about 850° C., in which range the oxidation resistance of $Al_4O_4C$ can be expressed, but also oxidation of $Al_4O_4C$ can be suppressed or prevented in the temperature range higher than about 850° C.

It must be noted here that "the Al component as a metal" contained in the refractory for casting of the present invention includes, excluding a compound with other element, an Al component derived from a raw material only including aluminum and an Al component derived from an aluminum-containing alloy raw material, and that the content in the range of 1.2 to 10% by mass, both inclusive, means the value converted only to the Al component as a metal.

When the content of the Al component as a metal is less than 1.2% by mass, the oxidation suppressing effects of C and of $Al_4O_4C$ in the refractory organization cannot be obtained. On the other hand, when the content thereof is more than 10% by mass, the metal aluminum reacts by the heat that is received during the use thereof, resulting in an excessive progress of densification, sintering, and the like; and thus, the thermal shock resistance cannot be obtained sufficiently.

The content of the Al component as a metal can be arbitrarily adjusted in accordance with an individual nozzle for casting, as well as a form and a use (operation) condition of the SN plate. With regard to the alloy containing the Al component as a metal, a metal aluminum-magnesia alloy, a metal aluminum-silicon alloy, and so forth may be used.

It is desirable that the metal aluminum or the alloy containing the metal aluminum be dispersed around the $Al_4O_4C$ particle (regardless of a ball-like form and a plate-like form). From this view point, it is desirable that the metal aluminum or the alloy containing the metal aluminum be atomized or in a fiber-like form with the size thereof being not more than 0.3 mm.

In an atmosphere of carbon monoxide at the temperature of 850° C. or higher, $Al_4O_4C$ undergoes the reaction expressed by the Equation 3, progressively from an interface of the particle contacting with the atmosphere to form a phase having $Al_2O_3$ and C as the main components. Therefore, in the case that the surface layer of $Al_4O_4C$ contacts with the aggregate raw material including $Al_4O_4C$, $Al_2O_3$, and $SiO_2$, the sintering takes place readily to form a network. Formation of the reaction layer like this protects $Al_4O_4C$ from a direct contact with the atmosphere thereby suppressing the oxidation of $Al_4O_4C$; however, the excessive progress of the reaction causes an excessive bonding, an increase in the modulus, and so forth, due to sintering with an oxide component and so forth that are present in the neighborhood thereof, resulting in a decrease in the thermal shock resistance.

Also, the metal aluminum or the metal aluminum-containing alloy melts when these are exposed to a temperature equal to or higher than their melting points, thereby penetrating into the matrix to form a network among the Al components as a metal; and depending on the atmosphere condition, $Al_2O_3$, or $Al_2O_3$ and C are separated by the reactions expressed in the following Equation 4 and Equation 5, resulting in enhancement of the strength along with densification of the organization. On the other hand, however, an eminently high modulus also results. Similarly, easily sintering oxides including an ultrafine alumina particle also form a network by sintering, so that an eminently high modulus along with a high strength can result.

4Al (1)+3C (s)=Al₄C₃ (s)  Equation 4

2Al+3CO=2Al₂O₃+3C  Equation 5

Given that the density of Al is 2.7, the density of C is 2.0, the density of Al₄C₃ is 2.36, and the density of Al₂O₃ is 3.9, in the case that Al separates Al₂O₃ and C as shown by the Equation 5, the volume expansion of about 120% is resulted, thereby leading to an eminent densification of the organization. In the case that the free C is dispersed in the matrix, the reaction thereof with a melted metal aluminum takes place, so that an aluminum carbide can be readily formed. The volume expansion due to the formation reaction of the aluminum carbide is about 5.2%; and therefore, the effect to densification of the organization is small, so that the densification takes place to a lesser extent as compared with the case of formation of Al₂O₃.

In order to suppress an excessive progress of the densification and an excessive increase in the modulus due to these reactions, presence of a certain amount of the free C is needed. The free C means, regardless of an amorphous form and a crystalline form, a C component to form a carbonaceous base material which does not form a compound with other element, wherein the C component includes a carbon derived from a binder such as a phenol resin, a graphite, a cokes powder, a pitch powder, a carbon black, and a powdery resin. Namely, the carbons present as the compounds, including Al₄O₄C, SiC, and B₄C, are not included.

By the presence of the free C in the state of dispersion in the refractory matrix, especially around the Al₄O₄C particle, separation of Al₂O₃ (and C) itself due to the reaction of Al₄O₄C or of the Al component as a metal can be suppressed. And, this also has an effect to cut off the network which is formed by the sintering and so forth with other aggregate raw material or the like, wherein the sintering and so forth are caused by this reaction or by the property change.

In order to have the characteristics which can withstand the use for a long period of time or the multiple repeat use, the content of Al₄O₄C (Al₄O₄C), the content of the Al component as a metal (Al), and the content of the free C (C) need to satisfy the Equation 1 and the Equation 2 so as to suppress and optimize the reaction between Al₄O₄C or Al component as a metal and Al₂O₃ or other refractory component.

1.0≤C/(Al₄O₄C×0.038+Al×0.33)  Equation 1

1.0≥C/(Al₄O₄C×0.13+Al×0.67)  Equation 2

As mentioned before, in a carbon monoxide atmosphere, Al₄O₄C separates Al₂O₃ and C by the reaction with carbon monoxide, so that the effect of the organization densification can be obtained, wherein one mole of Al has an effect to reduce 1.5 moles of carbon monoxide, while one mole of Al₄O₄C has an effect to reduce 3 moles of carbon monoxide. This shows that 5.1% by mass of Al₄O₄C has the same oxidation preventive effect as 1% by mass of Al.

In order to suppress the sintering or the excessive densification (increase in the modulus and so forth) due to the reaction of Al₄O₄C, it is desirable that at least the alteration layer formed in the interface of the Al₄O₄C particle be enclosed by the free C which is present in the matrix so as to avoid a direct contact of the alteration layer with the oxide including Al₂O₃ as much as possible.

In FIG. 1, the modulus of the refractory is shown which is obtained as follows: a sample was obtained by using, as a main raw material, a raw material containing Al₄O₄C and a raw material containing the free C with different volume ratios of the free C to the Al₄O₄C, this difference being brought about by changing the content of Al₄O₄C and the content of the free C, and then, this sample was baked in a non-oxidative atmosphere at 1300° C. As a result, it was confirmed that when 5.0% or more of the free C relative to the volume of Al₄O₄C is present, the tendency to decrease in the modulus becomes higher.

FIG. 2 illustrates the linear change rate after a sample is baked in a non-oxidative atmosphere at 1500° C., wherein the sample is obtained by adding carbon black (free C) having a primary particle diameter of 5 nm to a calcined alumina having an average particle diameter of 0.6 μm followed by kneading the resulting mixture with different addition amounts thereof and then by molding to a prescribed form. Under the condition without addition of C, shrinkage occurs by sintering from the contacting surface among the alumina particles themselves, wherein the shrinkage rate decreases with an increase in the addition amount of C; and the shrinkage rate becomes almost zero when the addition amount of C reaches about 10% by volume. From this, it is presumed that the sintering is suppressed by covering or enclosing the surface layer of the calcined alumina particle with the carbon black (C) thereby preventing the alumina particles from adhering among themselves.

Meanwhile, because it can be presumed that the kind of the particle hardly brings about the difference in the relationship between the thickness of the C layer around the particle and the sintering speed among the particles, or the sintering degree thereof, or the like, and also in order to make the confirmation of sintering easy, the calcined alumina is used here in place of Al₄O₄C.

In Table 1 (also in FIG. 3, in which Table 1 is illustrated by a graph), from this result, the rough calculation is made with regard to the thickness of the carbon black which covers or encloses the surface layer of the Al₄O₄C particle. From this rough calculation, it can be seen that, in the case that the addition amount of C is 10% by volume (7.66% by mass), sintering of Al₄O₄C can be suppressed when the thickness of the C layer around the Al₄O₄C particle, namely, the thickness of the carbon black (C) which covers or encloses the Al₄O₄C particle is 0.02 μm or more.

TABLE 1

| Al₄O₄C Average particle diameter | C Thickness of C layer | C/Al₄O₄C | |
|---|---|---|---|
| μm | μm | % By volume | % By mass |
| 0.6 | 0.01 | 5.08 | 3.77 |
| 0.6 | 0.015 | 7.69 | 5.70 |
| 0.6 | 0.02 | 10.34 | 7.66 |
| 0.6 | 0.025 | 13.03 | 9.65 |
| 0.6 | 0.03 | 15.76 | 11.68 |

Meanwhile, it is presumed that an increase of the modulus and so forth due to sintering of Al₄O₄C is brought about by densification of the organization due to the volume expansion upon separation of Al₂O₃ and C according to the Equation 3 as well as by the sintering of the separated $Al_2O_3$ with the oxide component including $Al_2O_3$ which is present around the separated $Al_2O_3$.

Next, in Table 2 (also in FIG. 4, in which Table 2 is illustrated by a graph), the calculation results are shown with regard to the volume ratio of the free C to $Al_4O_4C$ and the mass ratio of the same, wherein the surface layer of the particle is covered with or enclosed by the free C having the thickness of 0.02 μm with changing the average particle diameter of $Al_4O_4C$.

TABLE 2

| $Al_4O_4C$ Average particle diameter | C Thickness of C layer | C/$Al_4O_4C$ | |
|---|---|---|---|
| μm | μm | % By volume | % By mass |
| 1000 | 0.02 | 0.01 | 0.00 |
| 500 | 0.02 | 0.01 | 0.01 |
| 100 | 0.02 | 0.06 | 0.04 |
| 50 | 0.02 | 0.12 | 0.09 |
| 10 | 0.02 | 0.60 | 0.45 |
| 1.2 | 0.02 | 5.08 | 3.77 |
| 1 | 0.02 | 6.12 | 4.53 |

The minimum size of the $Al_4O_4C$ particle to satisfy two conditions—the condition to form the layer of the free C having the thickness of 0.02 μm on the surface layer of the $Al_4O_4C$ particle, and based on the experimental results of FIG. 1 as mentioned above, the condition of 5% by volume of the free C amount relative to the $Al_4O_4C$ amount necessary to obtain the effect of $Al_4O_4C$ to decrease the modulus—is 1.2 μm from this calculation result (Table 2). Namely, when the size of the $Al_4O_4C$ particle is 1.2 μm or more and the free C is added with the minimum amount of 5% by volume relative to this $Al_4O_4C$ particle amount, the free C layer having a necessary and sufficient thickness to decrease the modulus can be obtained around the $Al_4O_4C$ particle or among the particles, wherein the thickness of the free C increases as the size of the $Al_4O_4C$ particle increases. In other words, when the average particle diameter of $Al_4O_4C$ is 1.2 μm or more, even if the volume of the free C contained therein is not more than 5.0% relative to the volume of $Al_4O_4C$ contained therein, the free carbon can cover or enclose the surface of every particle of $Al_4O_4C$; namely, the suppression effect to sintering can be obtained.

Here, it should be noted that in the refractory for casting of the present invention, $Al_4O_4C$ plays a function, as a main constituting base material or as a part of the base material thereof, to enhance especially the thermal shock resistance. According to a technological common sense, the size of the base material to express the function like this is relatively large (sometimes this is also referred to as a coarse particle) or about medium (larger than fine powders of the matrix, wherein this part is also referred to as a medium particle). Namely, the average particle diameter of $Al_4O_4C$ in the refractory for casting of the present invention is inevitably more than 1.2 μm, and as described later, the size of the $Al_4O_4C$ crystal is preferably 20 μm or more; and thus, also the size of the $Al_4O_4C$ particle is preferably 20 μm or more.

From the discussion above, in the refractory for casting of the resent invention, when the free C is contained therein with the volume of at least 5.0% or more relative to the $Al_4O_4C$ content, it can be said that within the foregoing technological common sense, sintering and so forth with other refractory components present around the $Al_4O_4C$ particle can be suppressed regardless of the size of the $Al_4O_4C$ particle.

The free C with the volume of 5.0% or more relative to the volume of $Al_4O_4C$ is, when this is converted to the mass ratio on the basis of 2.7 as the density of $Al_4O_4C$ and 2.0 as the density of the free C, 3.8% or more by mass relative to the mass of $Al_4O_4C$.

Meanwhile, the free C present in the state of covering or enclosing the surface layer of the $Al_4O_4C$-containing raw material particle may be present as the bonding organization itself, as the refractory matrix or as a part thereof.

With regard to the Al component as a metal, too, the amount of C necessary to make the C layer exist for suppression of sintering around the Al component can be calculated. Incidentally, it is preferable to suppress the formation of $Al_2O_3$ from the Al component as a metal as expressed in the Equation 5, namely, to suppress the reaction causing a large amount of expansion, and therefore to facilitate the reaction expressed by the Equation 4 causing a smaller amount of expansion. That is, the amount of the free C necessary for the Al component as a metal to form the aluminum carbide shown by the Equation 4 is ¾ mole relative to 1 mole of the Al component, i.e., 33% or more by mass relative to the Al component.

From the above discussion, it can be said that the content of the free C necessary to exist so as to cover or enclose the surface layer of the $Al_4O_4C$-containing raw material particle or of the Al component as a metal is equal to or more than the sum of 3.8% or more by mass of the content of $Al_4O_4C$ and 33% or more by mass of the content of the Al component as a metal.

The relationship among the content of the free C, the content of the Al component as a metal, and the content of $Al_4O_4C$ can be expressed by the Equation 6.

$$C \le (Al_4O_4C \times 0.038 + Al \times 0.33)$$ Equation 6

Transformation of this leads to the Equation 1.

When this Equation 6, namely the Equation 1, is not satisfied, the suppression effects to the excessive progress of the densification, which is caused by the reactions of $Al_4O_4C$ and of Al as well as the sintering, and to the excessive increase in the modulus are so small that the attrition including a crack and an edge defect can readily occur during the time of casting for a long period of time.

On the other hand, if an excess of the free C exists, especially when exposed to an oxidative atmosphere in the neighborhood of the operation surface and so forth, the free C is oxidized by the following reactions.

$$2C + O_2 = 2CO$$ Equation 7

$$C + CO_2 = 2CO$$ Equation 8

When the free C is oxidized, this causes deterioration of the organization and facilitates the attrition, thereby becoming a cause to decrease in the tolerance. Especially, in the use for a long period of time or in the repeat use, this tendency becomes eminent.

As mentioned before, Al and $Al_4O_4C$ reduce the oxidized C by the reactions expressed by the Equation 3 and the Equation 5, thereby depositing the oxidized C as C and also densifying the organization, so that the oxidation preventive effect can be obtained.

From the Equation 5, 1 mole of Al has an effect to deposit 1.5 mole of the oxidized C again as C into the organization; however, the oxidized C more than 1.5 mole cannot be deposited as C. This indicates that 1% by mass of Al can have a suppression effect for oxidation of 0.67% by mass of C.

From the Equation 4, 1 mole of $Al_4O_4C$ has an effect to deposit 2 mole of the oxidized C as the original C; however, the oxidized C more than 2 mole cannot be deposited as C. When this is converted to the mass, this indicates that 1% by mass of $Al_4O_4C$ has a preventive effect for oxidation of 0.13% by mass of C.

Accordingly, the maximum amount of the free C which can be prevented from oxidation by $Al_4O_4C$ and the Al component as a metal in the refractory can be expressed by the Equation 9 when this is rewritten by converting to % by mass of the free C.

$$C \leq (Al_4O_4C \times 0.13 + Al \times 0.67) \qquad \text{Equation 9}$$

Transformation of this leads to the Equation 2.

This means that when the content of the free C does not satisfy the Equation 9, i.e., Equation 2, $Al_4O_4C$ and Al contained therein cannot suppress the oxidation of all of the free C contained therein.

In addition, from the Equation 6 and the Equation 9, the following relation can be derived.

$$(Al_4O_4C \times 0.038 + Al \times 0.33) \leq C \leq (Al_4O_4C \times 0.13 + Al \times 0.67) \qquad \text{Equation 10}$$

As mentioned above, $Al_4O_4C$ and the Al component as a metal deposit the oxidized C as C by reduction thereof, and also densify the organization not by the oxidized C but by the free C; and therefore, the preventive effect to oxidation can be obtained without decreasing the thermal shock resistance.

Advantageous Effects of Invention

According to the present invention, the thermal shock resistance can be enhanced while keeping the oxidation resistance, the corrosion resistance, and the abrasion resistance, so that the use for a long period of time and the repeat use become possible in the refractory for casting; these characteristics are required in the refractory for casting. Therefore, the nozzle for casting and the SN plate, both using the refractory for casting of the present invention, are suitable in the use for a long period of time or in the repeat use, so that an excellent tolerance can be obtained.

BRIEF DESCRIPTION OF THE DRAWINGS

FIG. 1 is an example of the experimental results illustrating the relationship between the modulus and the volume ratio of the free C to $Al_4O_4C$ in the refractory.

FIG. 2 is an experimental example illustrating the relationship between the addition amount of carbon black (free C) and the rate of change by baking.

FIG. 3 is an example of the experimental results illustrating the relationship between the average particle diameter of $Al_2O_3$ and the thickness of the C layer thereof ($C/Al_4O_4C$ in volume ratio and mass ratio) (this illustrates Table 1 by a graph).

FIG. 4 is an example of the experimental results illustrating the relationship between the average particle diameter of $Al_4O_4C$ and the thickness of the C layer thereof ($C/Al_4O_4C$ in volume ratio and mass ratio) (this illustrates Table 2 by a graph).

FIG. 5 is a conceptual diagram illustrating the range of the content of $Al_4O_4C$ and the amount of the free carbon of the present invention (the range determined by the Equation 1 and the Equation 2).

DESCRIPTION OF THE EMBODIMENTS

With regard to the $Al_4O_4C$-containing raw material particle to be used in the present invention, a size of the particle diameter thereof, a classification, a blending ratio, and the like may be selected in accordance with individual conditions and needs including the form of the refractory to be applied. For example, the particles are classified into the class of 5 to 3 mm, the class of 3 to 1 mm, and the class of 1 to 0 mm or to 0.074 mm or more; and then, these may be applied with an arbitrary ratio thereof. In order to enhance the effect to decrease the thermal expansion rate of the refractory, it is preferable to use the $Al_4O_4C$-containing raw material, which is of a low expansion in itself, as a relatively large particle, a so-called coarse aggregate. $Al_4O_4C$ is preferably in a ball-like form or in a form near to it; however, a plate-like form may be used as well.

The size of the $Al_4O_4C$ crystal in the $Al_4O_4C$-containing raw material particle is preferably 20 μm or more as an average diameter when a cross section of $Al_4O_4C$ crystal is converted to a circle. The larger the crystal diameter of $Al_4O_4C$ in the $Al_4O_4C$-containing raw material particle is, the more the change of $Al_4O_4C$ to $Al_2O_3$ can be suppressed even in the use condition of a long period of time, so that more amount of $Al_4O_4C$ can persist.

The $Al_4O_4C$-containing raw material particle is preferably an electromelted raw material melted by an arc, wherein a main constituting component of the electromelted raw material is preferably $Al_4O_4C$ and a corundum ($Al_2O_3$). With a conventional sintering method, productivity of the $Al_4O_4C$-containing raw material is low, so that an actual industrialization thereof is difficult; and in addition, production of the raw material capable of becoming a dense aggregate having a large crystal diameter of $Al_4O_4C$ is difficult. On the contrary, productivity of the electromelted raw material obtained by an arc melting is high, and also a dense aggregate raw material of $Al_4O_4C$ having an arbitrary particle size with a large crystal diameter can be obtained. Because of a high density as mentioned above, the contact area with an oxygen and a carbon monoxide is so small even under the conditions of high temperature and of oxidation so that the oxidation and change of $Al_4O_4C$ to an alumina can be suppressed, and therefore a low thermal expansion rate can persist for a long period of time. In addition, because a main constituting component other than $Al_4O_4C$ is a corundum ($Al_2O_3$), a high corrosion resistance can persist. Further, when the composition is made such that the electromelted $Al_4O_4C$-containing raw material may include a coarse particle having the size of, for example, 0.5 mm or more, mainly including, for example, regions of a so-called medium particle and coarse particle with the size of them being about 20 μm or more, the effect of the refractory to decrease the thermal expansion rate can be enhanced, so that the characteristics of the low thermal expansion rate can persist for a long period of time. At the same time, progress in the change of $Al_4O_4C$ to an alumina under the use condition for a long period of time can be suppressed (slowed).

With regard to the form of the metal aluminum which is the source of the Al component as a metal, any of a ball-like form, a flake-like form, and a fiber-like form may be used. In addition, it may also be used as an alloy with Si or Mg.

In the case that the refractory for casting of the present invention is baked in the temperature range of not lower than 660° C., the form of the metal aluminum to be used is preferably a ball-like form or a fiber-like form including an atomized powder which has a small specific surface area and can remain even until a comparatively high temperature region; and also, the grain size thereof is preferably 0.074 mm or more in terms of an average particle diameter with the amount thereof being in the range of 30 to 90 parts by mass, both inclusive, on the basis of 100 parts by mass of the metal aluminum to be used.

Because the volume expansion is smaller when an aluminum carbide is produced from the metal aluminum as compared with the case of producing an alumina therefrom, in order to suppress the densification and increase in the modulus, which are caused by the reactions of the metal aluminum, naturally it is preferable to produce the aluminum carbide rather than producing the alumina. Supposed that all of the metal aluminum contained therein (Al component as a metal) produces the aluminum carbide, it can be said that as shown in the Equation 4, the contents therein may be 3 moles of C relative to 4 moles of Al, namely 0.33% by mass of C relative to 1.1% by mass of Al, namely ⅓ of the free C.

However, slaking of the aluminum carbide as illustrated in the Equation 11 can take place under a condition such as the repeat use condition including a process in which important portions including, for example, a contacting surface with a melted steel and a moving surface of the plate refractory are exposed, regardless of a high temperature state and a low temperature state of not higher than several hundred Celsius, to a water vapor derived from an air or the like, as well as especially in the case that a large amount of the metal aluminum is present in the refractory; and as a result, destruction and the like of the refractory organization can occasionally occur.

$$Al_4C_3 + 6H_2O = 4Al(OH)_3 + 3CO + 9/2H_2 \qquad \text{Equation 11}$$

Under the condition of a general single use or the condition in which slaking of the aluminum carbide does not take place even in the use for a long period of time, namely under the condition of generally not higher than about 200° C. or under the use condition in which the slaking reaction with a water vapor does not take place, there is no adverse effect by production of the aluminum carbide, although these conditions are different depending on the organization, structure, composition, and the like of the refractory as well as the environment around the refractory; and therefore, production of the aluminum carbide itself is desirable.

Other than the conditions as mentioned above, under the condition including the repeat use, namely under the condition such that the slaking reaction of the aluminum carbide can take place, it is preferable to have a small amount of a metal Si or of an $SiO_2$ component contained therein so as to suppress this slaking reaction. By replacing a part of Al in the aluminum carbide with Si, the resistance to the slaking can be obtained.

Under the condition including the repeat use in the way as mentioned above, it is preferable that the refractory of the present invention contain a metal Si in the range of 0.5 to 10% by mass, both inclusive, as the mass ratio relative to the Al component as a metal, or a weight ratio of metal Si to Al component as a metal in the range of 0.1 to 2, both inclusive.

With regard to the aggregate other than $Al_4O_4C$, it is desirable to make $Al_2O_3$ as a main component. In the refractory of the present invention, the sum of the contents of $Al_4O_4C$, the Al component as a metal, and $Al_2O_3$ needs to be 85% or more, wherein it is desirable that a main component in the balance be the free C, a carbide, a nitride, a boride, or the like, or a refractory component containing a metal including silicon and magnesia.

Other refractory component as the balance after the contents of $Al_4O_4C$, the Al component as a metal, and $Al_2O_3$ with minimum sum thereof being 85% by mass and the content of the free C based on the Equation 1 and Equation 2 is a carbide, a boride, a nitride, a metal including Si and Mg, or an oxide including magnesia as well as a small amount of zirconia and silica.

As described above, in order to enhance the corrosion resistance to a slag and so forth, the infiltration resistance, the oxidation resistance, and the like, the balance may contain a carbide, a boride, a nitride, or the like. However, if the balance contains a large amount of a carbide, a boride, a nitride, or the like, an attrition by oxidation of these substances themselves or an attrition due to dissolution into a melted steel becomes large, thereby leading to a large attrition of the refractory. Also, if a large amount of a metal including Si and Mg is contained (for example, all of the balance), sintering of the refractory organization takes place notably, resulting in a decrease in the thermal shock resistance by an increase in the modulus or the like, thereby leading to an increase in the attrition including a crack and a destruction. If the content of the component including a zirconia or a silica is large, these are reduced to cause facilitation of the organization deterioration and the attrition. If the content of a magnesia is large, because not only the magnesia itself has a large thermal expansion rate when this is present as a periclase, but also a reaction with an alumina in the refractory generates a spinel-forming reaction which shows a large expansion behavior, resulting in an increase in a crack and an attrition due to a decrease in the thermal shock resistances. However, if the raw material contains the magnesia which has already been converted to a spinel, this may be treated in the same way as the alumina raw material.

With regard to these oxide components as a mineral, a β-alumina, a spinel, a mullite, a clay, a kaolinite, a monoclinic zirconia, a tetragonal zirconia, a glass layer, or the like may be contained therein. In order to prevent an eccentric expansion behavior along with metamorphosis, zirconia is preferably monoclinic or tetragonal.

The method for producing the refractory of the present invention will be shown by taking the SN plate as an example. The SN plate applied with the refractory of the present invention can be obtained by a general production method of a SN plate.

Namely, the production method includes: a step of mixing, with a prescribed particle size composition, an aggregate particle containing $Al_2O_3$ as a main component, a metal aluminum, a carbonaceous base aggregate, and other refractory raw materials constituting a balance thereof; a step of adding thereto an organic binder including a phenol resin which forms a carbon bond, followed by kneading the resulting mixture; a step of molding to a prescribed form of the SN plate; a step of drying and carrying out a heat treatment; and a step of processing a surface and so forth. Detailed condition in each of these steps can be optimized by an arbitrary design in accordance with individual conditions. The heat treatment is carried out preferably in a non-oxidative atmosphere, while more preferably in an inert gas atmosphere.

EXAMPLES

An organic binder was added to an $Al_4O_4C$-containing raw material, an alumina-based raw material, a metal aluminum, a carbonaceous raw material, and other fire resistant aggregate; and then, the resulting mixture was kneaded, molded to a refractory form by an oil press, dried, and then subjected to a heat treatment at a prescribed temperature to obtain a refractory. With regard to the $Al_4O_4C$-containing raw material, except for later-mentioned Example D (Table 6), an electromelted raw material particle containing $Al_4O_4C$ and corundum as main components was used, wherein the electromelted raw material particle had the maximum particle diameter (top size) of 1 mm with 50 μm of the $Al_4O_4C$ crystal size as an average diameter when a cross section of $Al_4O_4C$ crystal was converted to a circle.

The composition of the refractory thus obtained was analyzed in the way as described below.

In the refractory composition, $Al_4O_4C$, $Al_2O_3$ (corundum), Al (Al component as a metal), and Si were quantified by an internal standard method with an X-ray diffraction; and when a standard sample was not available, quantification was made with a profile by a Rietveld method. The free C (F. C.) and the total C (TOTAL C) were quantified in conformity with JIS-R-2012. Other components, namely, $ZrO_2$, $SiO_2$, and MgO, were quantified by a fluorescent X-ray in conformity with JIS-R-2216.

A specimen having a prescribed form was cut out from the obtained refractory; and the following evaluations were carried out for each specimen.

(1) Bulk specific gravity: this was measured in conformity with JIS-R-2205.

(2) Thermal expansion rate: this was measured in conformity with JIS-R-2207.

As for evaluation of conformity for the repeat use or multiple use, the oxidative abrasion resistance test and the thermal shock resistance test were carried out with a method in which heating under an oxidative atmosphere and cooling were repeated for 3 times, and also the slaking (hydration) test was carried out.

Specific evaluation contents are described below.

(3) Oxidative abrasion resistance: the specimen was subjected to a heat treatment under an atmospheric air at 1000° C. for 2 hours by using a rotary furnace, and then cooled; this operation was repeated for three times. In conformity with a BS (British Standard) abrasion method, the specimen after oxidation was blasted with an abrasive grain to quantify the abrasion amount. Then, this abrasion amount was expressed by an index relative to Comparative Example 6 (see, Table 5) as 100. It can be said that when the index is smaller, the oxidative abrasion resistance is higher.

(4) Thermal shock resistance: in order to evaluate the thermal shock resistance after change of the organization upon heat receiving, the specimen was subjected to a heat treatment under a non-oxidative atmosphere in an electric furnace at 1400° C. for 3 hours, and thereafter, soaked in a melted iron at 1600° C. for 3 minutes by using a high-frequency induction furnace, and then cooled. This evaluation was repeated for three times to evaluate the state of the specimen after the evaluation.

(5) Slaking resistance: the specimen with the form of 50 mm×50 mm×50 mm was heated under a non-oxidative atmosphere at 1400° C. for 3 hours, and then it was cooled to room temperature; thereafter, this specimen was kept under a humidified condition with 0.49 MPa at 150° C. for three hours by using an autoclave in conformity with the slaking test of a magnesia clinker described in the Gakushin method 4, and then, the appearance of the specimen after the test was evaluated.

Example A

Example A illustrates the examples in which the content of $Al_4O_4C$ in the refractory was studied. In Table 3, the compositions of each Example and the results thereof are summarized.

TABLE 3

|  | Comparative Example 1 | Comparative Example 2 | Example 1 | Example 2 | Example 3 | Comparative Example 3 |
|---|---|---|---|---|---|---|
| Refractory composition (% by mass) | | | | | | |
| $Al_4O_4C$ |  | 14 | 15 | 38 | 60 | 62 |
| $Al_2O_3$ | 90 | 75 | 71 | 48 | 25 | 25 |
| Al | 5 | 3 | 5 | 5 | 4 | 5 |
| F.C. | 3 | 2 | 4 | 3 | 5 | 6 |
| $Al_4O_4C + Al_2O_3 + Al$ | 95 | 92 | 91 | 91 | 89 | 92 |
| TOTAL C | 3.0 | 2.9 | 4.9 | 6.3 | 8.7 | 9.8 |
| Others (% by mass) | | | | | | |
| $ZrO_2$ | | | | | | |
| $SiO_2$ | 2 | 2 | 3 | 2 | 3 | 2 |
| MgO | | | | | | |
| $ZrO_2 + SiO_2 + MgO$ | 2 | 2 | 3 | 2 | 3 | 2 |
| Others (except for F.C.) total | 2 | 6 | 5 | 6 | 6 | 2 |
| Grand total | 100.0 | 100.0 | 100.0 | 100.0 | 100.0 | 100.0 |
| C/($Al_4O_4C$ × 0.038 + 0.33 × Al) | 1.82 | 1.31 | 1.80 | 1.29 | 1.39 | 1.50 |
| C/($Al_4O_4C$ × 0.13 + 0.67 × Al) | 0.90 | 0.52 | 0.75 | 0.48 | 0.48 | 0.53 |

TABLE 3-continued

|  | Comparative Example 1 | Comparative Example 2 | Example 1 | Example 2 | Example 3 | Comparative Example 3 |
|---|---|---|---|---|---|---|
| Evaluation results |  |  |  |  |  |  |
| Bulk specific gravity | 3.30 | 3.12 | 3.10 | 2.88 | 2.62 | 2.60 |
| Thermal expansion rate (%) at 1000° C. | 0.88 | 0.67 | 0.64 | 0.55 | 0.44 | 0.43 |
| Oxidative abrasion resistance (index) | 70 | 70 | 60 | 55 | 40 | 45 |
| Thermal shock resistance | Large crack | Large crack | Medium crack | Faint crack | Medium crack | Large crack |

Comparative Example 1 not containing $Al_4O_4C$ but mainly containing $Al_2O_3$ was taken as the typical example of the conventional technology. It can be seen that the thermal expansion rate tends to decrease notably with an increase in the content of $Al_4O_4C$. In Comparative Example 2 containing 14% by mass of $Al_4O_4C$, the thermal expansion rate becomes lower as compared with Comparative Example 1 as the conventional technology, but the thermal shock resistance after receiving the heat treatment is not sufficient. The oxidative abrasion resistance thereof is as same as that of Comparative Example 1, but the thermal shock resistance is not sufficient when considering the use condition including the repeat use for a long period of time.

It can be seen that in Examples 1 to 3 containing 15 to 60% by mass of $Al_4O_4C$, both the thermal shock resistance and the oxidative abrasion resistance are improved, and thus, these can withstand the conditions including the repeat use. In Comparative Example 3 containing 62% by mass of $Al_4O_4C$, the oxidative abrasion resistance is improved significantly as compared with Comparative Example 1 as the conventional technology, but this shows the tendency of decrease in the thermal shock resistance.

Example B

Example B illustrates the examples in which the total content of $Al_4O_4C$, $Al_2O_3$, and Al component as a metal in the refractory was studied. In Table 4, the compositions of each Example and the results thereof are summarized.

TABLE 4

|  | Comparative Example 4 | Example 4 | Example 5 | Example 1 | Example 3 |
|---|---|---|---|---|---|
| Refractory composition (% by mass) |  |  |  |  |  |
| $Al_4O_4C$ | 20 | 20 | 20 | 15 | 60 |
| $Al_2O_3$ | 58 | 60 | 60 | 71 | 25 |
| Al | 5 | 5 | 5 | 5 | 4 |
| F.C. | 5 | 5 | 5 | 4 | 5 |
| $Al_4O_4C + Al_2O_3 + Al$ | 83 | 85 | 85 | 91 | 89 |
| TOTAL C | 6.2 | 6.2 | 6.2 | 4.9 | 8.7 |
| Others (% by mass) |  |  |  |  |  |
| $ZrO_2$ | 7 | 4 |  |  |  |
| $SiO_2$ | 3 | 3 | 3 | 3 | 3 |
| MgO |  |  |  |  |  |
| $ZrO_2 + SiO_2 + MgO$ | 10 | 7 | 3 | 3 | 3 |
| Others (except for F.C.) total | 12 | 10 | 10 | 5 | 6 |
| Grand total | 100.0 | 100.0 | 100.0 | 100.0 | 100.0 |
| $C/(Al_4O_4C \times 0.038 + 0.33 \times Al)$ | 2.07 | 2.07 | 2.07 | 1.80 | 1.39 |
| $C/(Al_4O_4C \times 0.13 + 0.67 \times Al)$ | 0.84 | 0.84 | 0.84 | 0.75 | 0.48 |
| Evaluation results |  |  |  |  |  |
| Bulk specific gravity | 3.04 | 3.02 | 3.01 | 3.10 | 2.62 |
| Thermal expansion rate (%) at 1000° C. | 0.60 | 0.61 | 0.61 | 0.64 | 0.44 |
| Oxidative abrasion resistance (index) | 80 | 70 | 60 | 60 | 40 |
| Thermal shock resistance | Collapse | Medium crack | Small crack | Medium crack | Medium crack |

Comparative Example 4, in which the content of $ZrO_2$ in the refractory was 7% by mass and the foregoing total content was 83% by mass, resulted in a collapse in the thermal shock resistance test. This collapse is presumably caused by formation of ZrC and slaking thereof. However, in Example 4 in which 4% by mass of $ZrO_2$ was contained and the foregoing total content was 85% by mass, there was no collapse; and it can be seen that this can be used even under the condition of the repeat use. Besides Example 4, also in Example 5, Example 1, and Example 3, in all of which the total contents were 85% or more by mass, the oxidative abrasion resistance was excellent, so that these can be used even under the condition of the repeat use.

Example C

Example C illustrates the examples in which the Equation 1 and the Equation 2 in relation with the content of the free C were studied. In Table 5, the compositions of each Example and the results thereof are summarized.

TABLE 5

| | Comparative Example 5 | Example 6 | Example 1 | Example 7 | Example 8 | Comparative Example 6 | Example 9 | Example 10 |
|---|---|---|---|---|---|---|---|---|
| Refractory composition (% by mass) | | | | | | | | |
| $Al_4O_4C$ | 20 | 38 | 15 | 50 | 38 | 20 | 16 | 16 |
| $Al_2O_3$ | 66 | 48 | 71 | 40 | 48 | 65 | 62 | 75 |
| Al | 7 | 5 | 5 | 1.2 | 4 | 2 | 9 | 1 |
| F.C. | 3 | 3.1 | 4 | 5 | 7.6 | 5 | 8 | 1.5 |
| $Al_4O_4C + Al_2O_3 + Al$ | 93 | 91 | 91 | 91.2 | 90 | 87 | 87 | 92 |
| TOTAL C | 4.2 | 5.4 | 4.9 | 8.1 | 9.9 | 6.2 | 9.0 | 2.5 |
| Others (% by mass) | | | | | | | | |
| $ZrO_2$ | | | | | | | | |
| $SiO_2$ | 2 | 3 | 3 | 3 | 2 | 2 | 3 | 3 |
| MgO | | | | | | | | |
| $ZrO_2 + SiO_2 + MgO$ | 2 | 3 | 3 | 3 | 2 | 2 | 3 | 3 |
| Others (except for F.C.) total | 4 | 5.9 | 5 | 3.8 | 2.4 | 8 | 5 | 6.5 |
| Grand total | 100.0 | 100.0 | 100.0 | 100.0 | 100.0 | 100.0 | 100.0 | 100.0 |
| $C/(Al_4O_4C \times 0.038 + 0.33 \times Al)$ | 0.98 | 1.00 | 1.80 | 2.18 | 2.75 | 3.52 | 2.24 | 1.60 |
| $C/(Al_4O_4C \times 0.13 + 0.67 \times Al)$ | 0.41 | 0.37 | 0.75 | 0.68 | 1.00 | 1.27 | 0.99 | 0.55 |
| Evaluation results | | | | | | | | |
| Bulk specific gravity | 3.05 | 2.90 | 3.10 | 2.73 | 2.86 | 3.03 | 3.02 | 3.10 |
| Thermal expansion rate (%) at 1000° C. | 0.62 | 0.56 | 0.64 | 0.45 | 0.54 | 0.60 | 0.63 | 0.65 |
| Oxidative abrasion resistance (index) | 35 | 48 | 60 | 75 | 80 | 100 | 50 | 70 |
| Thermal shock resistance | Large crack | Faint crack | Medium crack | Faint crack | Faint crack | Small crack | Small crack | Medium crack |

| | Comparative Example 7 | Comparative Example 8 | Example 11 | Comparative Example 9 | Example 12 | Comparative Example 10 |
|---|---|---|---|---|---|---|
| Refractory composition (% by mass) | | | | | | |
| $Al_4O_4C$ | 16 | 16 | 58 | 58 | 58 | 58 |
| $Al_2O_3$ | 60 | 75 | 18 | 16 | 30 | 35 |
| Al | 10 | 0.5 | 9 | 10 | 0.5 | 0.5 |
| F.C. | 10 | 0.5 | 13 | 16 | 3.5 | 2 |
| $Al_4O_4C + Al_2O_3 + Al$ | 86 | 91.5 | 85 | 84 | 88.5 | 93.5 |
| TOTAL C | 10.0 | 1.5 | 16.6 | 19.6 | 7.1 | 5.6 |
| Others (% by mass) | | | | | | |
| $ZrO_2$ | | | | | | |
| $SiO_2$ | 3 | 3 | 1 | | 3 | 3 |
| MgO | | | | | | |
| $ZrO_2 + SiO_2 + MgO$ | 3 | 3 | 1 | | 3 | 3 |
| Others (except for F.C.) total | 4 | 8 | 2 | | 8 | 4.5 |
| Grand total | 100.0 | 100.0 | 100.0 | 100.0 | 100.0 | 100.0 |
| $C/(Al_4O_4C \times 0.038 + 0.33 \times Al)$ | 2.56 | 0.65 | 2.51 | 2.91 | 1.48 | 0.84 |
| $C/(Al_4O_4C \times 0.13 + 0.67 \times Al)$ | 1.14 | 0.21 | 0.96 | 1.12 | 0.44 | 0.25 |
| Evaluation results | | | | | | |
| Bulk specific gravity | 3.01 | 3.11 | 2.70 | 2.68 | 2.73 | 2.75 |
| Thermal expansion rate (%) at 1000° C. | 0.62 | 0.66 | 0.45 | 0.44 | 0.47 | 0.49 |
| Oxidative abrasion resistance (index) | 105 | 60 | 60 | 110 | 40 | 55 |
| Thermal shock resistance | Medium crack | Large crack | Faint crack | Faint crack | Medium crack | Large crack |

Examples 6 to 12 and Example 1, all of which satisfy the Equation 1 and the Equation 2, are excellent in both the thermal shock resistance and the oxidative abrasion resistance. On the contrary, Comparative Example 5, Comparative Example 8, and Comparative Example 10, all of which do not satisfy the Equation 1 which is significantly influential to the thermal shock resistance, are excellent in the oxidative abrasion resistance but are low in the thermal shock resistance. On the other hand, Comparative Example 6, Comparative Example 7, and Comparative Example 9, all of which do not satisfy the Equation 2 which is significantly influential to the oxidative abrasion resistance, are excellent in the thermal shock resistance but are significantly low in the oxidative abrasion resistance.

Example D

Example D illustrates the examples in which by using an $Al_4O_4C$-containing raw material, the effects of the production method of this raw material, of the crystal size of the $Al_4O_4C$ crystal, and of the particle size of the raw material thereof (top size) were studied. In Table 6, the compositions of each Example and the results thereof are summarized. Meanwhile, the crystal size (dimensions of the crystal) of the $Al_4O_4C$ crystal means an average diameter when a cross section of the $Al_4O_4C$ crystal is converted to a circle. In other words, the crystal size here means an average value of each circle's diameter when a cross section of each of the $Al_4O_4C$ crystals is converted to a circle.

TABLE 6

| | Example 13 | Example 14 | Example 15 | Example 16 | Example 5 | Example 17 |
|---|---|---|---|---|---|---|
| Production method of $Al_4O_4C$-containing raw material | Melting method | Sintering method | Melting method | Melting method | Melting method | Melting method |
| Refractory composition (% by mass) | | | | | | |
| $Al_4O_4C$ | 20 | 20 | 20 | 20 | 20 | 20 |
| $Al_2O_3$ | 60 | 60 | 60 | 60 | 60 | 60 |
| Al | 5 | 5 | 5 | 5 | 5 | 5 |
| F.C. | 5 | 5 | 5 | 5 | 5 | 5 |
| $Al_4O_4C + Al_2O_3 + Al$ | 85 | 85 | 85 | 85 | 85 | 85 |
| TOTAL C | 6.2 | 6.2 | 6.2 | 6.2 | 6.2 | 6.2 |
| Others (% by mass) | | | | | | |
| $ZrO_2$ | — | — | — | — | — | — |
| $SiO_2$ | 3 | 3 | 3 | 3 | 3 | 3 |
| Others total | 10 | 10 | 10 | 10 | 10 | 10 |
| Grand total | 100.0 | 100.0 | 100.0 | 100.0 | 100.0 | 100.0 |
| $C/(Al_4O_4C \times 0.057 + 0.33 \times Al)$ | 2.07 | 2.07 | 2.07 | 2.07 | 2.07 | 2.07 |
| $C/(Al_4O_4C \times 0.13 + 0.67 \times Al)$ | 0.87 | 0.87 | 0.87 | 0.87 | 0.87 | 0.87 |
| Top size of Al4O4C-containing raw material (mm) | | | | | | |
| 3 | | | | ○ (good) | | |
| 1 | | | | | ○ | |
| 0.5 | | | ○ | | | ○ |
| 0.21 | ○ | | | | | |
| 0.074 | | ○ | | | | |
| Crystal size of $Al_4O_4C$ (μm) | 20 | 5 | 15 | 20 | 50 | 50 |
| Evaluation results | | | | | | |
| Bulk specific gravity | 3.12 | 3.13 | 3.12 | 3.09 | 3.01 | 3.11 |
| Thermal expansion rate (%) at 1000° C. | 0.64 | 0.65 | 0.63 | 0.60 | 0.61 | 0.62 |
| Oxidative abrasion resistance (index) | 75 | 55 | 70 | 55 | 60 | 60 |
| Thermal shock resistance | Medium crack | Medium crack | Medium crack | Small crack | Small crack | Small crack |

Examples 13, 16, 5, and 17 illustrate the examples in which the raw materials produced by a melting method (arc melting method) with the top size thereof being 0.21 mm or more and the crystal size of the $Al_4O_4C$ crystal being 20 μm or more were used; and Example 14 illustrates the example

Example E

Example E illustrates the examples in which the effects of a metal Si were studied. In Table 7, the compositions of each Example and the results thereof are summarized.

TABLE 7

|  | Example 18 | Example 19 | Example 20 | Example 21 | Example 22 | Example 23 |
|---|---|---|---|---|---|---|
| Refractory composition (% by mass) | | | | | | |
| $Al_4O_4C$ | 40 | 40 | 40 | 40 | 40 | 40 |
| $Al_2O_3$ | 45 | 40 | 45 | 40 | 40 | 40 |
| Al | 5 | 5 | 5 | 5 | 5 | 5 |
| Si |  | 0.4 | 0.5 | 5 | 10 | 11 |
| F.C. | 5 | 5 | 5 | 5 | 5 | 4 |
| Si/Al(%) | 0 | 8 | 10 | 100 | 200 | 220 |
| $Al_4O_4C + Al_2O_3 + Al$ | 90 | 85 | 90 | 85 | 85 | 85 |
| TOTAL C | 7.5 |  | 7.5 |  | 7.5 | 6.5 |
| Others (% by mass) | | | | | | |
| $SiO_2$ | 1 | 1 | 1 | 1 | 1 |  |
| MgO |  |  |  |  |  |  |
| $ZrO_2 + SiO_2 + MgO + Si$ | 1 | 1 | 1.5 | 1 | 11 | 11 |
| Others (except for F.C.) total | 5 | 9.6 | 4.5 | 5 | 0 | 0 |
| Grand total | 100.0 | 100.0 | 100.0 | 100.0 | 100.0 | 100.0 |
| $C/(Al_4O_4C \times 0.038 + 0.33 \times Al)$ | 1.58 | 1.58 | 1.58 | 1.58 | 1.58 | 1.26 |
| $C/(Al_4O_4C \times 0.13 + 0.67 \times Al)$ | 0.58 | 0.58 | 0.58 | 0.58 | 0.58 | 0.47 |
| Evaluation results | | | | | | |
| Bulk specific gravity | 2.83 | 2.88 | 2.82 | 2.87 | 2.82 | 2.82 |
| Thermal expansion rate (%) at 1000° C. | 0.54 | 0.53 | 0.53 | 0.52 | 0.53 | 0.53 |
| Oxidative abrasion resistance (index) | 57 | 55 | 52 | 35 | 45 | 40 |
| Thermal shock resistance | Faint crack | Faint crack | Faint crack | Faint crack | Small crack | Medium crack |
| Slaking resistance | Medium crack | Small crack | No change | No change | No change | No change | in which the raw material produced by a sintering method with the top size thereof being 0.074 mm and the crystal size of the $Al_4O_4C$ crystal being 5 μm was used.

Because the raw material in Example 14 is produced by a sintering method, the crystal size of the $Al_4O_4C$ crystal is 5 μm, so small and fine; and thus, the lowering effect to the thermal expansion rate is small. Moreover, because the reaction to $Al_2O_3$ (conversion to a corundum) is facilitated by the heat treatment, the thermal expansion rate and the modulus are increased, thereby leading to a slight decrease in the thermal shock resistance even though the content of $Al_4O_4C$ is 20% by mass.

Example 15 illustrates the example in which the $Al_4O_4C$ raw material produced by a melting method (arc melting method) is so small and fine with the crystal size of the $Al_4O_4C$ crystal being 15 μm; and thus, the lowering effect to the thermal expansion rate is somewhat small. Moreover, because the reaction to $Al_2O_3$ (conversion to a corundum) is facilitated by the heat treatment, the thermal expansion rate and the modulus are increased, thereby leading to a slight decrease in the thermal shock resistance even though the content of $Al_4O_4C$ is 20% by mass.

In Example 18 in which the metal Si was not contained, a medium crack was formed in the test with an autoclave. And, in Example 15 in which 8% by mass of the metal Si relative to the Al component as a metal was contained, a small crack was formed in the test with an autoclave. On the other hand, in Examples 20 to 22 in which a weight ratio of metal Si to Al component as a metal in the range of 0.1 to 2 was contained, there was no change in the test with an autoclave, thereby giving good results. In Example 23 in which a weight ratio of metal Si to Al component as a metal in the range of 0.1 to 2 was contained, the test with an autoclave gave a good result without no change; however, the thermal chock resistance was slightly decreased even though the content of $Al_4O_4C$ was 20% by mass. It is presumed that this result was obtained because the metal Si further formed a strong bond.

Example F

Example F illustrates the examples in which the refractory of the present invention was applied to the SN plate so as to test in an actual SN device. In Table 8, the compositions of each Example and the results thereof are summarized.

TABLE 8

|  | Example 24 | Comparative Example 11 | Comparative Example 12 |
|---|---|---|---|
| Refractory composition (% by mass) | | | |
| $ZrO_2$ | | 7.0 | 6.0 |
| $SiO_2$ | | 4.5 | 5.5 |
| $Al_4O_4C$ | 40.0 | | |
| $Al_2O_3$ | 45.0 | 78.0 | 77.0 |
| Al | 5.0 | | 2.0 |
| Si | 1.0 | | 0.1 |
| $B_4C$ | 1.0 | 1.0 | 1.0 |
| SiC | 1.0 | 2.0 | 4.0 |
| F.C. | 5.0 | 6.0 | 3.0 |
| $Al_4O_4C + Al_2O_3 + Al$ | 90.0 | 90.0 | 90.0 |
| TOTAL C | 7.5 | 6.6 | 4.2 |
| Others total | 2.0 | 1.5 | 1.4 |
| Grand total | 100.0 | 100.0 | 100.0 |
| $C/(Al_4O_4C \times 0.057 + 0.33 \times Al)$ | 1.27 | — | — |
| $C/(Al_4O_4C \times 0.13 + 0.67 \times Al)$ | 0.58 | — | — |
| Top size of $Al_4O_4C$-containing raw material | 1 mm | — | — |
| Evaluation results | | | |
| Bulk specific gravity | 2.82 | 3.35 | 3.28 |
| Thermal expansion rate (%) at 1000° C. | 0.53 | 0.78 | 0.75 |
| Actual furnace use result A | | | |
| Number of use | 11ch | 7ch | 8ch |
| Casting time (TOTAL) | 440 min | 280 min | 320 min |
| Use result | Excellent | Very rough surface | Edge defect |
| Use of reproduced actual furnace use result A | | | |
| Number of use | 10ch | 7ch | Formation of crack (impossible to reproduce) |
| Casting time (TOTAL) | 400 min | 280 min | |
| Use result | Excellent | Very rough surface | |
| Actual furnace use result B | | | |
| Number of use | 7ch | 5ch | 5ch |
| Casting time (TOTAL) | 840 min | 600 min | 600 min |
| Use result | Excellent | Very rough surface | Edge defect |

In Table 8, the use condition shown in "Actual furnace use result A" is the condition in which the refractory is used as the SN plated for a ladle of 250 tons with the average casting time per 1 ch of about 40 minutes and with the multiple use of 8 ch or more. In "Use of reproduced actual furnace use result A" shows the results of the use of the reproduced SN plate which was obtained by a reproduction of the SN plate used in the actual furnace use result A, wherein the reproduction is made by reprocessing the actually used SN palate, followed by interpolating a ring thereto, and then followed by polishing the moving surface thereof.

On the other hand, the use condition shown in "Actual furnace use result B" is the condition in which the refractory is used as the SN plate for a ladle of 300 tons with the average casting time per 1 ch of 120 minutes and with the use of 5 ch or more, thus for a long period of time in casting with the total time of 500 minutes or more.

In Comparative Example 11 using the refractory of a conventional technology not containing the metal Al and so forth, a large attrition (surface roughness) was caused in the moving surface in any of the use conditions. Therefore, an adequate tolerance could not be obtained. In Comparative Example 12 using the same conventional material but containing the metal Al and so forth, in both the actual furnace use results A and B, not only a large crack but also an edge defect was formed. Therefore, an adequate tolerance could not be obtained. Further, under the use condition of the reproduced actual furnace use result A, a crack was formed during the time of processing the SN plate after the use thereof; and thus, the reproduction thereof could not be achieved. This is presumably due to slaking of the aluminum carbide.

On the contrary, in Example 24, under any of the conditions, both the attrition of the moving surface (surface roughness) and the crack were not serious, and an adequate tolerance was obtained.

The invention claimed is:

1. A refractory for casting, wherein the refractory for casting contains $Al_4O_4C$ in the range of 15 to 60% by mass, both inclusive, an Al component as a metal in the range of 1.2 to 10.0% by mass, both inclusive, and a balance comprising $Al_2O_3$, a free C, and other refractory component; a sum of $Al_4O_4C$, $Al_2O_3$, and the Al component as a metal is 85% or more by mass; and a content of $Al_4O_4C$ ($Al_4O_4C$), a content of the Al component as a metal (Al), and a content of the free C (C) satisfy following Equation 1 and Equation 2:

$$1.0 \leq C/(Al_4O_4C \times 0.038 + Al \times 0.33) \quad \text{Equation 1}$$

$$1.0 \geq C/(Al_4O_4C \times 0.13 + Al \times 0.67) \quad \text{Equation 2.}$$

2. The refractory for casting according to claim 1, wherein the $Al_4O_4C$ is derived from an $Al_4O_4C$-containing raw material particle produced by an electromelting method.

3. The refractory for casting according to claim 2, wherein a size of an $Al_4O_4C$ crystal in the $Al_4O_4C$-containing raw material particle is 20 μm or more as an average diameter when a cross section of the $Al_4O_4C$ crystal is converted to a circle.

4. The refractory for casting according to claim 1, wherein the other refractory component in the balance is one or more of the following materials: MgO, $SiO_2$, a tetragonal or a monoclinic $ZrO_2$, SiC, $B_4C$, BN, $Si_3N_4$, and a metal Si.

5. The refractory for casting according to claim 1, wherein a metal Si is contained therein with a weight ratio of the metal Si to the Al component as a metal in the range of 0.1 to 2, both inclusive.

6. A nozzle for casting or a plate for a sliding nozzle, wherein the refractory for casting according to claim 1 is arranged in part or all of the nozzle for casting or of the plate for a sliding nozzle.

7. The refractory for casting according to claim 2, wherein the other refractory component in the balance is one or more of the following materials: MgO, $SiO_2$, a tetragonal or a monoclinic $ZrO_2$, SiC, $B_4C$, BN, $Si_3N_4$, and a metal Si.

8. The refractory for casting according to claim 3, wherein the other refractory component in the balance is one or more of the following materials: MgO, SiO$_2$, a tetragonal or a monoclinic ZrO$_2$, SiC, B$_4$C, BN, S$_3$N$_4$, and a metal Si.

9. The refractory for casting according to claim 2, wherein a metal Si is contained therein with a weight ratio of the metal Si to the Al component as a metal in the range of 0.1 to 2, both inclusive.

10. The refractory for casting according to claim 3, wherein a metal Si is contained therein with a weight ratio of the metal Si to the Al component as a metal in the range of 0.1 to 2, both inclusive.

11. The refractory for casting according to claim 4, wherein the metal Si is contained therein with a weight ratio of the metal Si to the Al component as a metal in the range of 0.1 to 2, both inclusive.

12. The refractory for casting according to claim 7, wherein the metal Si is contained therein with a weight ratio of the metal Si to the Al component as a metal in the range of 0.1 to 2, both inclusive.

13. The refractory for casting according to claim 8, wherein the metal Si is contained therein with a weight ratio of the metal Si to the Al component as a metal in the range of 0.1 to 2, both inclusive.

14. A nozzle for casting or a plate for a sliding nozzle, wherein the refractory for casting according to claim 2 is arranged in part or all of the nozzle for casting or of the plate for a sliding nozzle.

15. A nozzle for casting or a plate for a sliding nozzle, wherein the refractory for casting according to claim 3 is arranged in part or all of the nozzle for casting or of the plate for a sliding nozzle.

16. A nozzle for casting or a plate for a sliding nozzle, wherein the refractory for casting according to claim 4 is arranged in part or all of the nozzle for casting or of the plate for a sliding nozzle.

17. A nozzle for casting or a plate for a sliding nozzle, wherein the refractory for casting according to claim 5 is arranged in part or all of the nozzle for casting or of the plate for a sliding nozzle.

* * * * *